United States Patent
Yuan et al.

(10) Patent No.: US 12,470,951 B2
(45) Date of Patent: Nov. 11, 2025

(54) METHODS AND APPARATUS FOR DETERMINING AR FILTER COEFFICIENT AND TIMES OF SYNCHRONIZATION

(71) Applicant: MediaTek Inc., Hsinchu (TW)

(72) Inventors: Yuan Yuan, Beijing (CN); Jianwei Zhang, Beijing (CN); Jun Hu, Beijing (CN); Nien-En Wu, HsinChu (TW); Peng Yang, Beijing (CN); Kuan-Lin Chen, Hsinchu (TW); Yen-Chen Chen, Hsinchu (TW); Cheng-Yu Tsai, Hsinchu (TW); Zhi Zheng, Beijing (CN)

(73) Assignee: MediaTek Inc., Hsinchu (TW)

( * ) Notice: Subject to any disclaimer, the term of this patent is extended or adjusted under 35 U.S.C. 154(b) by 338 days.

(21) Appl. No.: 18/336,997

(22) Filed: Jun. 17, 2023

(65) Prior Publication Data

US 2023/0413073 A1 Dec. 21, 2023

Related U.S. Application Data

(60) Provisional application No. 63/353,077, filed on Jun. 17, 2022.

(30) Foreign Application Priority Data

May 16, 2023 (CN) .......................... 202310551310.1

(51) Int. Cl.
*H04W 24/02* (2009.01)
*H04B 17/10* (2015.01)
(Continued)

(52) U.S. Cl.
CPC .......... *H04W 24/02* (2013.01); *H04B 17/101* (2015.01); *H04B 17/201* (2023.05); *H04B 17/328* (2023.05); *H04W 76/27* (2018.02)

(58) Field of Classification Search
CPC ...................................................... H04W 24/02
See application file for complete search history.

(56) References Cited

U.S. PATENT DOCUMENTS 9,332,456 B2 * 5/2016 Heo .................. H04W 36/0088
9,503,978 B2 * 11/2016 Ji ...................... H04W 52/0216
(Continued)

*Primary Examiner* — Guang W Li
(74) *Attorney, Agent, or Firm* — Helen Mao; Imperium Patent Works

(57) ABSTRACT

Apparatus and methods are provided for determining AR filter coefficient and numbers of synchronization. In one novel aspect, the AR filter coefficient and times of synchronization are determined based on the temperatures of the oscillator. In one embodiment, the UE determines a temperature drift rate by collecting sets of temperatures before and after the UE in the sleep mode of the CDRX, generates one or more threshold look-up tables and performs an optimization selection based on the temperature drift rate and the one or more threshold of look-up tables, wherein the optimization selection comprising selecting an alpha coefficient and a number of subframes for synchronization. In another embodiment, the optimization selection is further determined based on a subcarrier spacing, and a channel type of being a static channel type and a fading channel type. The UE further performs an on-the-fly oscillator S-curve calibration based on the set of temperatures.

20 Claims, 5 Drawing Sheets

(51) Int. Cl.
  *H04B 17/20*   (2015.01)
  *H04B 17/318*  (2015.01)
  *H04W 76/27*   (2018.01)

(56) References Cited

U.S. PATENT DOCUMENTS

| | | | |
|---|---|---|---|
| 11,595,890 B2 * | 2/2023 | Shahid | H04W 52/0245 |
| 2017/0317681 A1 * | 11/2017 | Liu | H04W 76/28 |
| 2019/0369682 A1 * | 12/2019 | Prabhakar | H04W 52/0274 |
| 2020/0267655 A1 * | 8/2020 | Awoniyi-Oteri | H04W 52/0216 |
| 2021/0232190 A1 * | 7/2021 | Zhu | H04W 52/0251 |
| 2023/0126623 A1 * | 4/2023 | Schiocchet | H04W 72/0446 370/311 |

* cited by examiner

METHODS AND APPARATUS FOR DETERMINING AR FILTER COEFFICIENT AND TIMES OF SYNCHRONIZATION

CROSS REFERENCE TO RELATED APPLICATIONS

This application claims priority under 35 U.S.C. § 119 from U.S. Provisional Application No. 63/353,077 entitled "METHODS FOR DETERMINING AR FILTER COEFFICIENT AND TIMES OF SYNCHRONIZATION," filed on Jun. 17, 2022. This application claims priority under 35 U.S.C. § 119 from Chinese Application Number 202310551310.1, titled "METHODS FOR DETERMINING AR FILTER COEFFICIENT AND TIMES OF SYNCHRONIZATION," filed on May 16, 2023. The disclosure of each of the foregoing documents is incorporated herein by reference.

TECHNICAL FIELD

The disclosed embodiments relate generally to wireless communication, and, more particularly, to determine coefficient for auto regression (AR) filter and times of synchronization.

BACKGROUND

With the development and availability of 5G fast expanding worldwide, the demand of wireless data traffic is continually increasing. The requirement for high performance mobile devices as well as power efficiency becomes more and more important. One of the key performance indicators for 3GPP mobile devices is the frequency error. Frequency error is the difference between the actual frequency of the received signal and the expected frequency of the signal. The total frequency error in a 3GPP mobile device can be divided into three components: Doppler shift, estimation error, and oscillator drift. Doppler shift is caused by the movement of the UE relative to the base station. Estimation error is caused by the inaccuracy of the frequency estimator. Oscillator drift introduced by temperature is also an important factor. When a UE is static, the temperature of the oscillator can change, which can cause the oscillator to drift in frequency. This frequency drift can be a major component of frequency error in CDRX during sleep mode. Oscillator drift is caused by the instability of the oscillator. To ensure the decoding performance large AR filter could compensate oscillator drift quickly, while small AR filter is better for noise suppression. In low SNR range, due to larger estimation error, we will use more reference signal to make the estimation more accurate, resulting in higher power consumption.

Improvements and enhancements are required to improve the selection and AR filter coefficient and times of synchronization.

SUMMARY

Apparatus and methods are provided for determining AR filter coefficient and numbers of synchronization. In one novel aspect, the AR filter coefficient and times of synchronization are determined based on the temperatures of the oscillator. In one embodiment, the UE collects sets of temperatures before the UE goes to a sleep mode of CDRX cycle and after the UE exits the sleep mode of the CDRX, determines a temperature drift rate of the UE before and after the sleep mode of the CDRX cycle based on the sets of temperatures, generates one or more threshold look-up tables and performs an optimization selection based on the temperature drift rate and the one or more threshold of look-up tables, wherein the optimization selection comprising selecting an alpha coefficient and a number of subframes for synchronization. In one embodiment, the one or more look-up tables of thresholds are based on one or more factors comprising an alpha coefficient from a sync module of the UE, and a signal noise ratio (SNR) from a noise estimator. In another embodiment, the optimization selection is further determined based on one or more elements comprising a subcarrier spacing, and a channel type. The channel type is determined based on a trained simulation model, and wherein the channel type comprises a static channel type and a fading channel type. In one embodiment, the channel type is determined based on a variation rate of a reference signal received power (RSRP). In one embodiment, the UE further performs an on-the-fly oscillator S-curve calibration based on the set of temperatures. In another embodiment, a trained S-curve under different temperatures is generated based on the calibration. In yet another embodiment, an oscillator drift compensation is performed based on the trained S-curve under different temperatures. In one embodiment, a predefined lower value of the alpha coefficient and a predefined lower number of subframes for synchronization are selected when the temperature drift caused frequency drift is smaller than a threshold based on the one or more look-up tables. In another embodiment, the optimization selection is performed when the temperature is within a predefined temperature range.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (Collectively referred to as "elements"). These elements may be implemented using electronic hardware, computer software, or any combination thereof. Whether such elements are implemented as hardware or software depends upon the particular application and design constraints imposed on the overall system.

Figure 1:
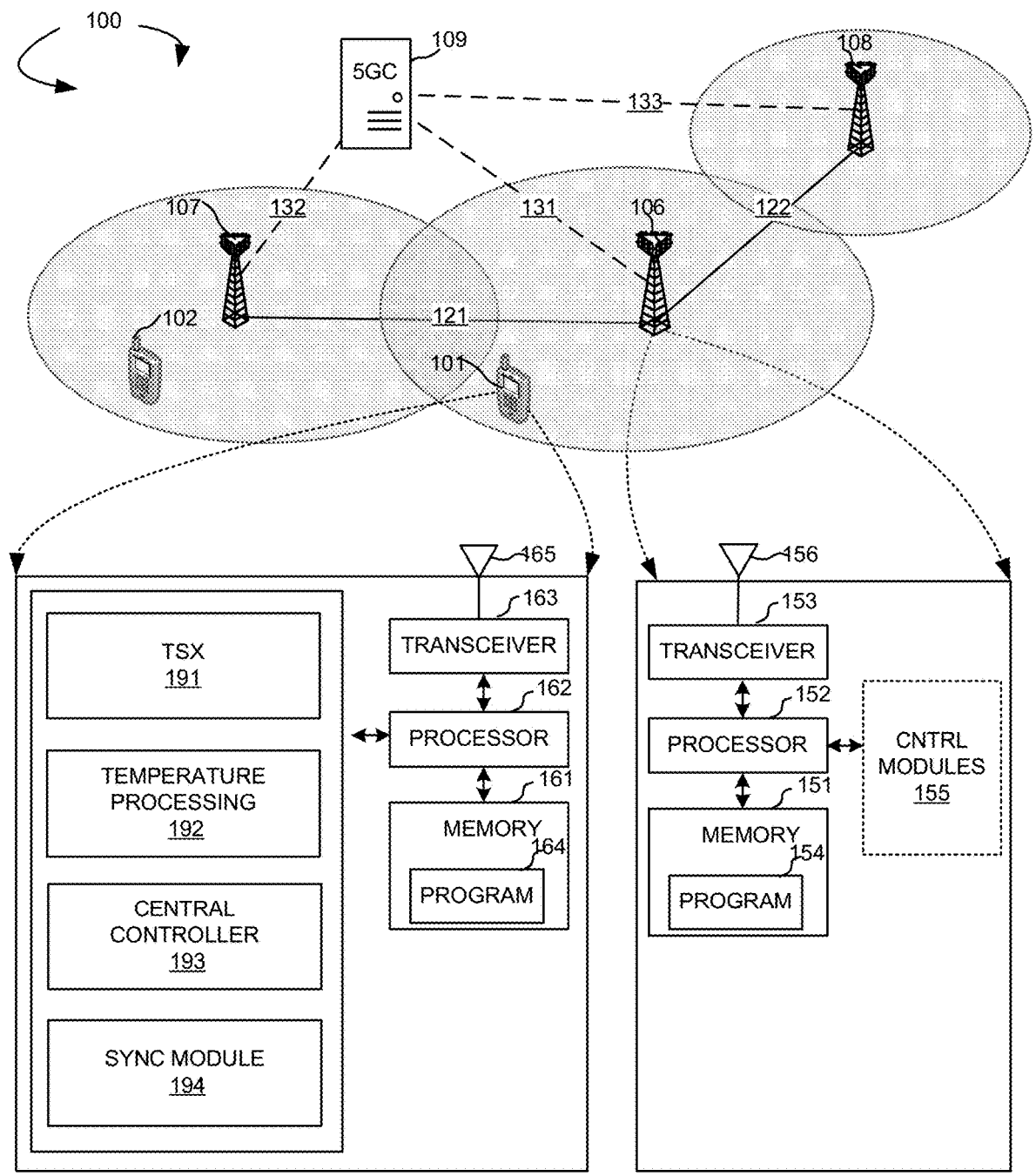
FIG. 1 is a schematic system diagram illustrating an exemplary wireless network that supports optimization in selecting coefficient for AR filter and times of synchronization in accordance with embodiments of the current invention.

FIG. 1 is a schematic system diagram illustrating an exemplary wireless network that supports optimization in selecting coefficient for AR filter and times of synchronization in accordance with embodiments of the current invention. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. As an example, UE 101 or mobile station 101 is only in the service area of gNB 106 and connected with gNB 106. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively.

In the current wireless network, connected discontinuous reception (CDRX) is used for many benefits including power saving. CDRX allows the device to enter a low-power state for extended periods of time, while still being able to receive data when it is needed. When a device is in CDRX mode, it will periodically wake up to check for new data. The length of the wake-up period is determined by the device and the network. The device will then go back to sleep until the next wake-up period. When UE is static, the oscillator drift introduced by temperature is a major component of frequency error in CDRX during sleep mode if it exists. In one novel aspect, the temperature difference between the time when the UE goes to sleep and when the UE wakes up is obtained. If the temperature change/drift is smaller than a predefined threshold, the UE uses a smaller AR filter to achieve more accurate estimation and uses less subframes for synchronizations to achieve less power consumption. In one embodiment the predefined threshold is obtained through one or more look-up tables of threshold generated by the UE.

FIG. 1 further illustrates simplified block diagrams of a base station and a mobile device/UE that supports optimization in selecting coefficient for AR filter and times of synchronization. gNB 106 has an antenna 156, which transmits and receives radio signals. An RF transceiver circuit 153, coupled with the antenna 156, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations. These control modules can be implemented by circuits, software, firmware, or a combination of them.

FIG. 1 also includes simplified block diagrams of a UE, such as UE 101. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver 163 may comprise two RF modules (not shown) which are used for different frequency bands transmitting and receiving. RF transceiver 163 also converts received baseband signals from processor 162, converts them to RF signals, and sends out to antenna 165. Processor 162 processes the received baseband signals and invokes different functional modules to perform features in UE 101. Memory 161 stores program instructions and data 164 to control the operations of UE 101. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. A temperature sensing oscillator (TSX) 191 obtains sets of temperatures of the UE before the UE goes to a sleep mode of a connected discontinuous reception (CDRX) cycle and after the UE exits the sleep mode of the CDRX cycle. A temperature processing module 192 determines a temperature drift rate of the UE before and after the sleep mode of the CDRX cycle based on the set of temperatures. A central controller 193 generates one or more threshold look-up table and performs an optimization selection based on the temperature drift rate and the one or more threshold look-up tables, wherein the optimization selection comprising selecting an alpha coefficient and a number of subframes for synchronization. A sync module 194 receives network signals, such as reference signals, from the network and applies the selected/optimized alpha coefficient and performs synchronization with the selected number of subframes.

Figure 2:
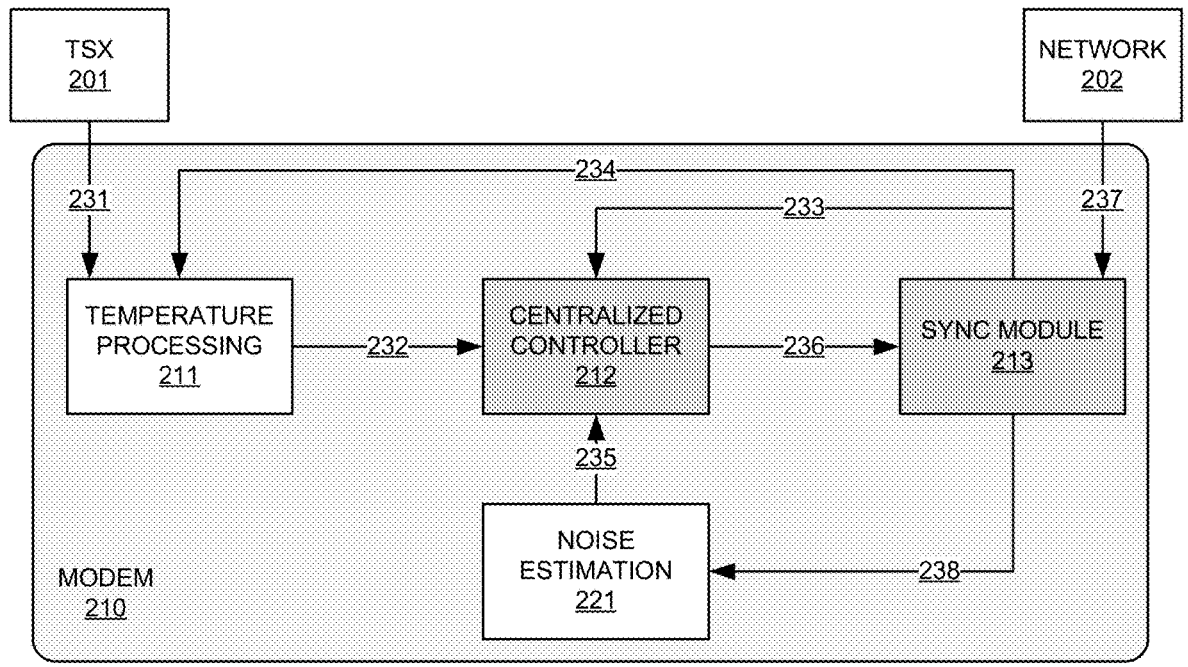
FIG. 2 illustrates an exemplary diagram of a modem of the UE that estimates a temperature drift rate and optimizes the selection of AR filter coefficient and number of synchronizations in accordance with embodiments of the current invention.

FIG. 2 illustrates an exemplary diagram of a modem of the UE that estimates a temperature drift rate and optimizes the selection of AR filter coefficient and number of subframes for synchronization in accordance with embodiments of the current invention. In one novel aspect, the modem of the UE is configured to determine the AR filter coefficient and times of synchronization based on one or more elements including collected TSX temperature drift, signal to nose ratio (SNR), subcarrier spacing, and a loop AR filter coefficient of a sync module. A TSX 201 monitors and collects a set of temperatures of the oscillator. A modem 210 includes a temperature processing module 211, a centralized controller 212, a sync module 213, and a noise estimation module 221.

TSX 201 inputs the collected temperatures (231) to a temperature processing module 211. Temperature processing module 211 receives frequency drift estimation (234) from sync module 213 and temperature inputs (231) from TSX 201. In one embodiment, temperature processing module 211 performs on-the-fly calibration of oscillator S-curve. The trained S-curve generated by temperature processing module 211 can be used to compensate oscillator drift under different temperatures. Centralized controller 212 receives signal information (235), such as SNR from noise estimation module 221. Centralized controller 212 further receives frequency drift information and alpha coefficient (233) from sync module 213, and temperature inputs and trained S-cure, and calibration status (232) from temperature processing module 211. Centralized controller 212 combines SNR from noise estimation module 221 and alpha coefficient of sync module 213, and generates one or more look-up tables of threshold. For example, information 233 from sync module includes the estimation and the results of the compensation based on the estimation. The better the estimation, the wider range of tolerance for the temperature drift is allowed. For example, a SNR-MCS and layers table helps to determine the optimal MCS that can be used for data transmission under different SNR conditions. Based on the MCS, a maximum frequency error threshold is generated for different SNR using simulation. In one embodiment, the one or more look-up tables of threshold include entries related to the maximum frequency error, SNR, frequency drift, and alpha coefficient. Centralized controller 212 collects TSX temperature and S-curve training status, and calculates the temperature drift rate. Centralized controller 212 compares the temperature drift rate and the threshold, and determines if the UE can use less subframes for synchronization. Centralized controller 212 informs sync module 213 of the determined coefficient and times of synchronization. Sync module 213 provides information (238) from the network to noise estimation module 221. Sync module 213 performs frequency compensation according to the suitable alpha coefficient from centralized controller 212 (236), SNR and oscillator drift. Sync module 213 also provides network interface to modem 210. Sync module 213 receives network signals (237), such as the reference signals (e.g., SSB or tracking reference signal), from network 202 and processes these signals.

Figure 3:
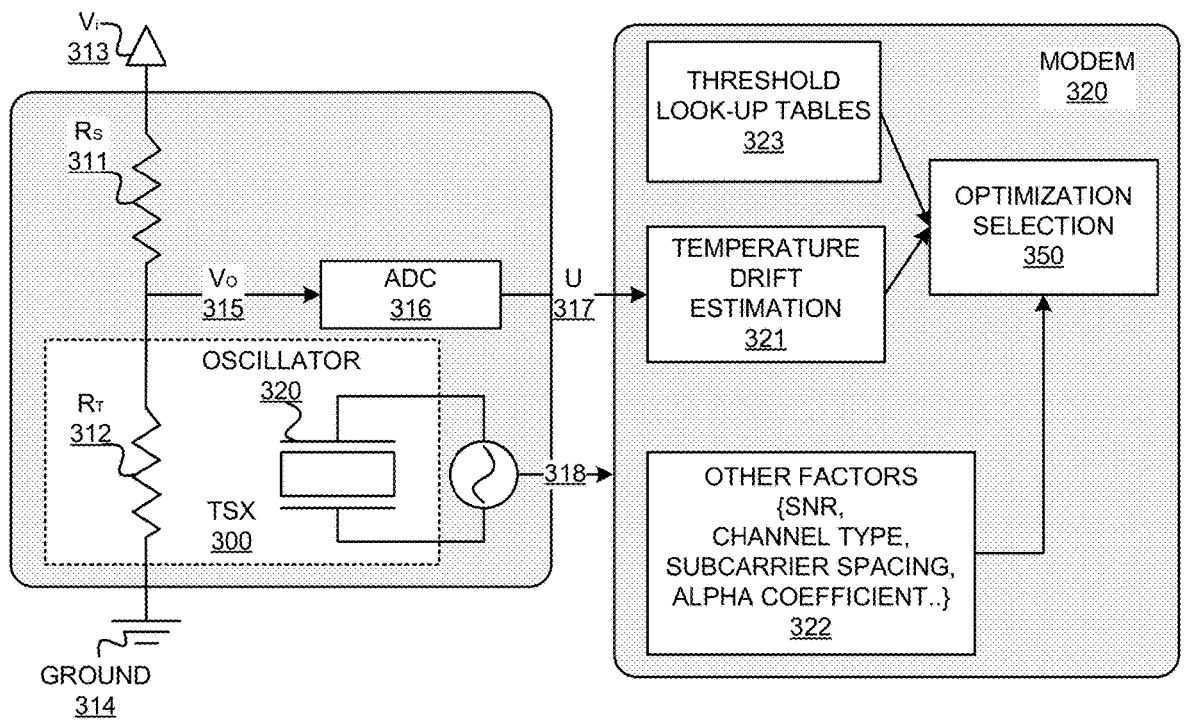
FIG. 3 illustrates an exemplary diagram of the TSX of the UE that sends real-time oscillator temperature to the modem to generate temperature drift estimation in accordance with embodiments of the current invention.

FIG. 3 illustrates an exemplary diagram of the TSX of the UE that sends real-time oscillator temperature to the modem to generate temperature drift estimation in accordance with embodiments of the current invention. A TSX includes an oscillator 320 and thermistor 312. The thermistor is a type of resistor whose resistance changes with temperature. Resistor Rs 311 and a resistor Rt 312 are in series between Vi 313 and ground 314. The partial voltage is proportional to the resistance of the thermistor, which is in turn inversely proportional to the temperature. Therefore, thermistor's partial voltage Vo 315 reflects the resistance of the thermistor. An analog to digital converter (ADC) 316 converts the partial voltage 315 to a signal 317 representing the temperature of the TSX 300 to modem 320. Clock 318 is provided to modem 320. Modem 320 uses the temperature inputs from TSX 300 to estimated temperature drift (321). Modem 320 compares the temperature drift 321 with threshold based on look-up tables for threshold 323. Modem 320 performs optimization selection (350) for AR filter coefficient and times of synchronization. In one embodiment, optimization selection 350 further based on one or more other factors (322), including SNR, channel type, subcarrier spacing and alpha coefficient of the sync module.

Figure 4:
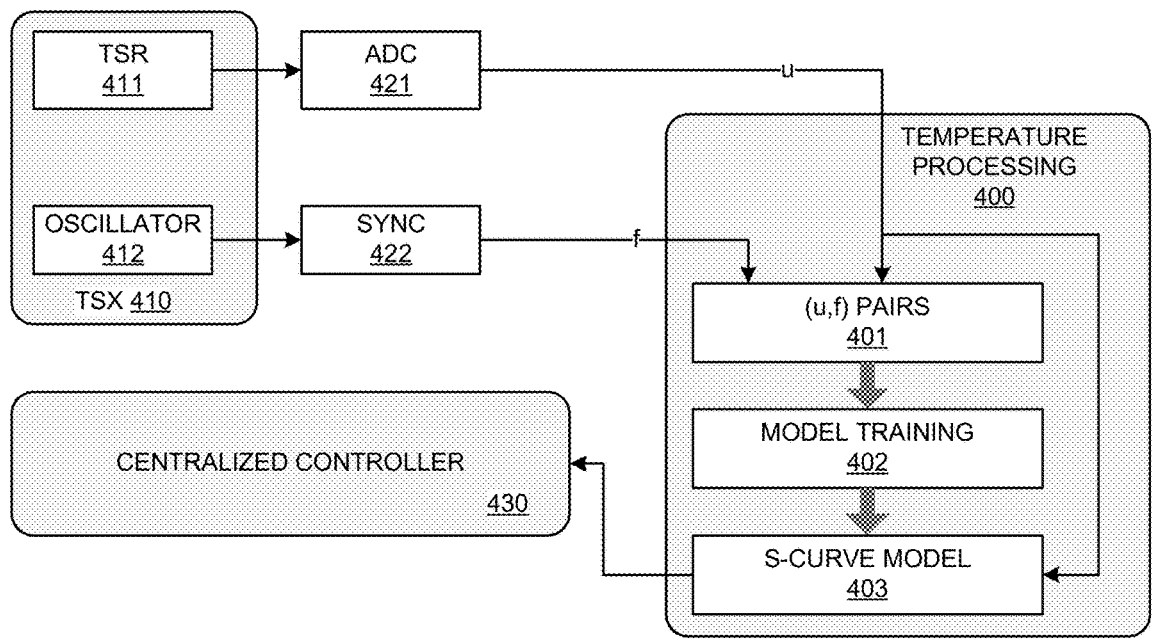
FIG. 4 illustrates an exemplary diagram of the temperature processing module that performs calibration and s-curve training for oscillator compensation in accordance with embodiments of the current invention.

FIG. 4 illustrates an exemplary diagram of the temperature processing module that performs calibration and S-curve training for oscillator compensation in accordance with embodiments of the current invention. Temperature processing module 400 receives (u,f) pair from ADC 421 and sync module 422. TSX 410 includes a thermistor (TSR) 411 that could sense the temperature and an oscillator 412. An ADC 421 converts the output of TSR to signal/input u. Sync module 422 provides frequency drift estimation (f) to temperature processing module 400. Temperature processing module 400 receives (u,f) pairs 401, which indicates a frequency drift under a temperature. Temperature processing module 400 performs on-the-fly calibration of oscillator S-curve and model training (402) based on the (u,f) pairs 401. In one embodiment, trained S-curve under different temperatures is generated based on the calibration. The temperature processing module 400 generates the S-curve model (403). The S-curve is trained and generated by measuring the frequency drift at a variety of temperatures. The S-curve model 403 is feedback to sync module 422. Sync module 422 performs frequency compensation based on the S-curve. Temperature processing 400 also sends S-curve training status to centralized controller 430. In one embodiment, a frequency drift caused by temperature drift is determined based on the trained S-curve. In another embodiment, the sync module 422 performs oscillator drift compensation based on the trained S-curve under different temperatures.

Figure 5:
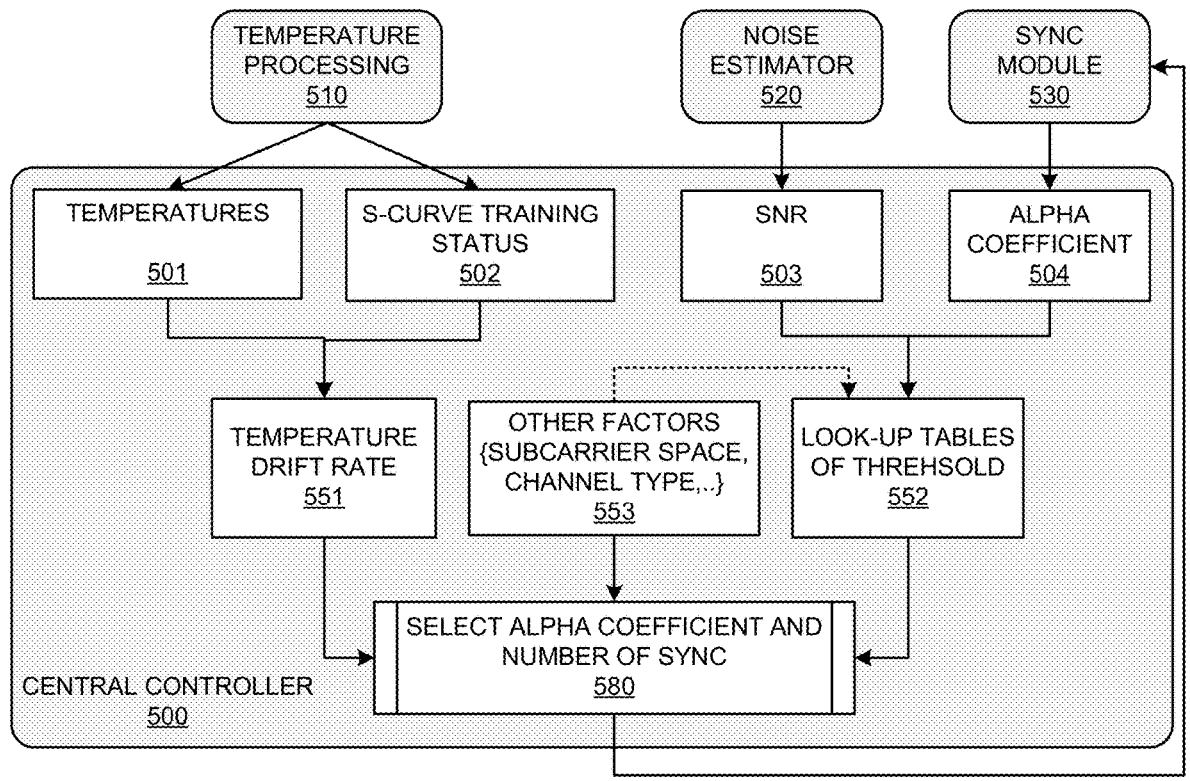
FIG. 5 illustrates an exemplary diagram of the central controller that compares a temperature drift rate with one or more thresholds and determines an optimized AR filter coefficient and number of synchronization in accordance with embodiments of the current invention.

FIG. 5 illustrates an exemplary diagram of the central controller that compares a temperature drift rate with one or more thresholds and determines an optimized AR filter coefficient and number of subframes for synchronization in accordance with embodiments of the current invention. The centralized controller 500 receives inputs from temperature processing module 510, noise estimator 520 and sync module 530. Centralized controller 500 receives temperatures (501) and S-curve training status (502) from temperature processing module 510. Centralized controller 500 calculates temperature drift rate (551) based on inputs 501 and 502 from the temperature processing module 510. When the temperature drift is small, the AR filter coefficient is lower and the number of subframes for synchronization is reduced. The centralized controller determines that smaller AR filter is selected and less subframes are used for synchronization. In one embodiment, when the temperature drift rate is smaller than a predefined threshold, a smaller alpha coefficient for the AR filter is selected, compared to the alpha coefficient for the AR filter when the optimization selection is not performed. In one embodiment, when the temperature drift rate is smaller than a predefined threshold, a smaller alpha coefficient for the AR filter is selected than the case when the temperature drift rate is larger than the threshold. In other embodiments, alpha coefficient further depends on one or more factors including the SNR, subcarrier spacing (SCS), and channel type. The smaller the temperature drift rate, the lower the value of the alpha coefficient. For example, in a given set of configuration, when the temperature drift is lower than a first threshold, alpha coefficient is ½, when the temperature drift is between a first and a second threshold, the alpha coefficient is h. Similarly, when the temperature drift rate is smaller than a threshold, less subframes are used for synchronization than the case when the temperature drift rate is larger than the threshold. In one embodiment, when the temperature drift rate is smaller than a threshold, less subframes are used for synchronization, compared to the case when the optimization selection is not performed. In one embodiment, the centralized controller 500 determines whether to perform the optimization selection for the AR filter coefficient and the number of subframes based on the temperature received. The optimization is performed when the temperature is within a normal temperature range. When the temperature is outside a normal range, the optimization selection is not performed even if the temperature drift is smaller than the predefined threshold. In one embodiment, the normal range is a temperature range that exclude extreme high or low temperatures. For instance, as a temperature range that the UE supported is −20° C.~80° C., the normal range may be set to 10° C.~40° C.

Centralized controller 500 combines SNR 503 received from noise estimator 520 and alpha coefficient 504 from sync module 530, and generates one or several look-up tables of threshold (552). In one embodiment, centralized controller 500 compares the temperature drift rate 551 and look-up tables of threshold 552 and determines, at 580, whether the UE can use less subframes for synchronization. In other embodiments, other factors (553) are considered in determining the coefficient and number of subframes for synchronization. The one or more other factors including subcarrier spacing and a channel type. The channel type includes a static channel type and a fading channel type. In one embodiment, the channel type is determined based on the reference signal received power (RSRP). In one embodiment, a channel type simulation based on RSRP variation is generated. The channel type simulation is a statistical process that collects a large number of samples of RSRP variation. The samples are then used to determine the probability distribution of RSRP variation. The probability distribution is used to determine the threshold for a static channel or a fading channel. The channel type simulation is used to determine the threshold for a static channel or a fading channel. The threshold is used to classify channels as static or fading. In one embodiment, the channel type indicates whether the UE is moving and the RSRP drift rate is used to determine the channel type. In another embodiment, the centralized controller 500 sends the selection indication to synch module 530. Sync module 530 follows the selection indication from centralized controller 500.

Figure 6:
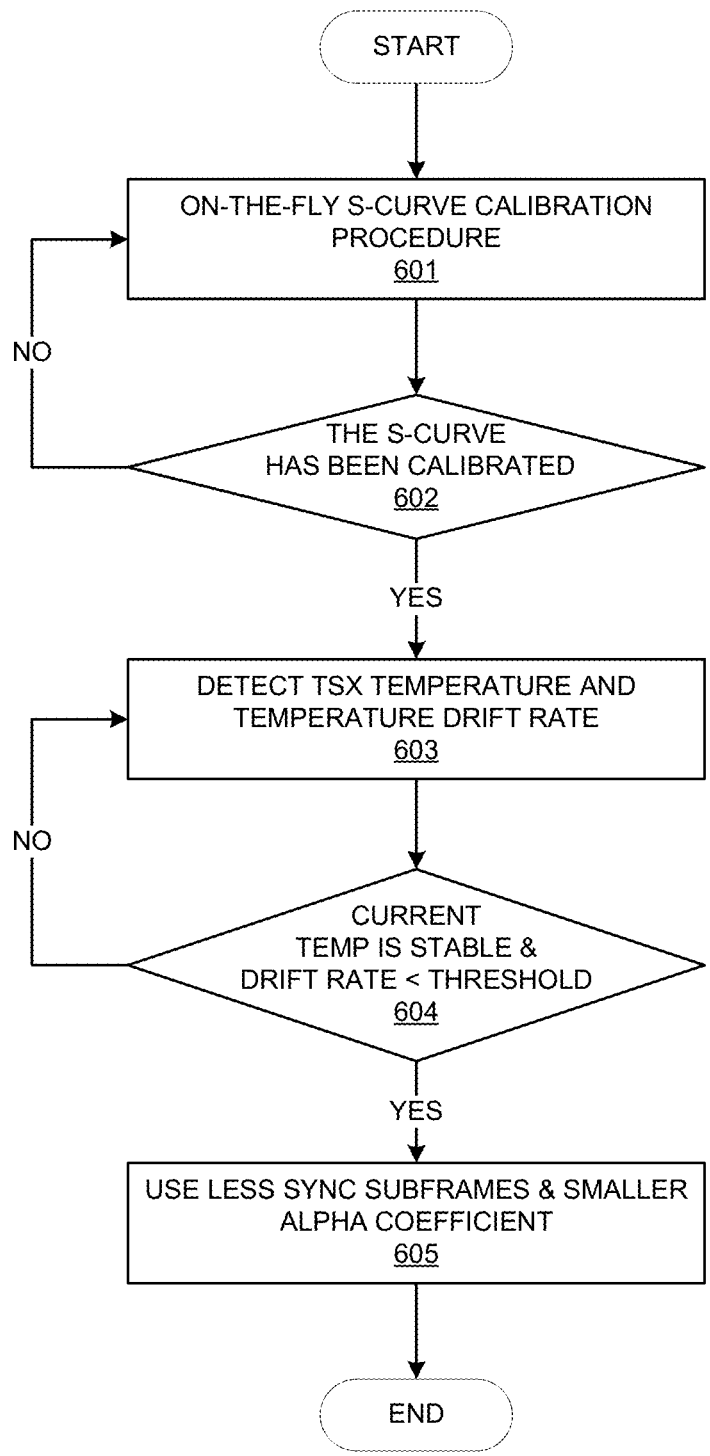
FIG. 6 illustrates an exemplary flow diagram for the optimization selection for the coefficient and synchronization in accordance with embodiments of the current invention.

FIG. 6 illustrates an exemplary flow diagram for the optimization selection for the coefficient and synchronization in accordance with embodiments of the current invention. At step 601, the UE performs on-the-fly S-curve calibration procedure. At step 602, the UE determines whether the S-curve has been calibrated. If step 602 determines no, the UE moves back to step 601 and performs on-the-fly S-curve calibration procedure. If step 602 determines yes, the UE, at step 603, detects the TSX temperature and temperature drift rate. At step 604, the UE determines if the current temperature is stable and the drift rate is less than a predetermined threshold. If step 604 determines no, the UE moves back to step 603. If step 604 determines yes, the UE, at step 605, uses less subframes for synchronization and smaller alpha coefficient.

Figure 7:
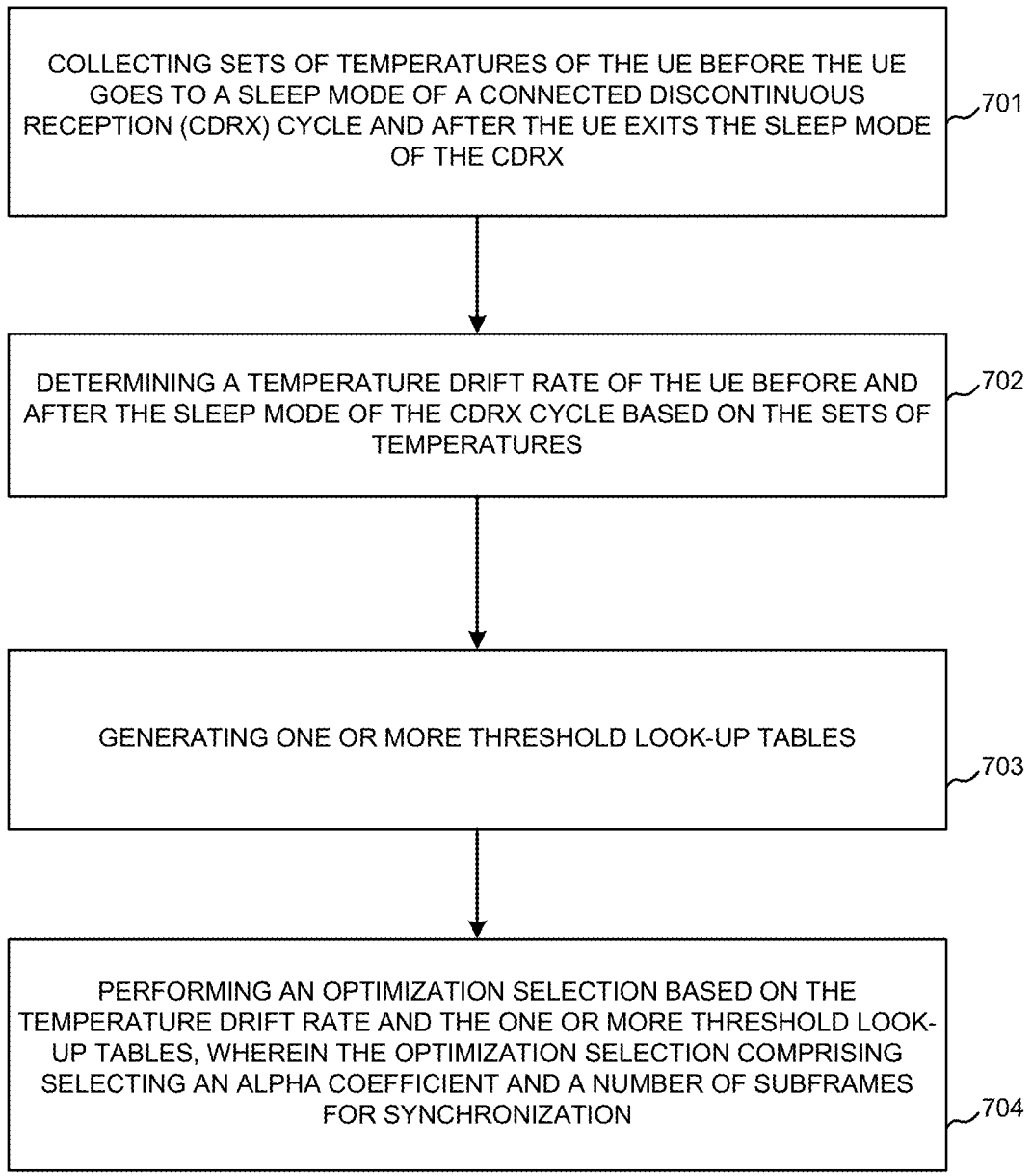
FIG. 7 illustrates an exemplary flow chart for determining AR filter coefficient and times of synchronization in accordance with embodiments of the current invention.

FIG. 7 an exemplary flow chart for determining AR filter coefficient and times of synchronization in accordance with embodiments of the current invention. At step 701, the UE obtains sets of temperatures of the UE before the UE goes to a sleep mode of a connected discontinuous reception (CDRX) cycle. At step 702, the UE determines a temperature drift rate of the UE before and after the sleep mode of the CDRX cycle based on the sets of temperatures. At step 703, the UE generates one or more threshold look-up tables. At step 704, the UE performs an optimization selection based on the temperature drift rate and the one or more threshold look-up tables, wherein the optimization selection comprising selecting an alpha coefficient and a number of subframes for synchronization.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE) in a wireless network comprising:
   obtaining sets of temperatures of the UE before the UE goes to a sleep mode of a connected discontinuous reception (CDRX) cycle and after the UE exits the sleep mode of the CDRX cycle;
   determining a temperature drift rate of the UE before and after the sleep mode of the CDRX cycle based on the sets of temperatures;
   generating one or more threshold look-up tables; and
   performing an optimization selection based on the temperature drift rate and the one or more threshold look-up tables, wherein the optimization selection comprising selecting an alpha coefficient and a number of subframes for synchronization.

2. The method of claim 1, wherein the one or more look-up tables of thresholds are based on one or more factors comprising an alpha coefficient, and a signal noise ratio (SNR).

3. The method of claim 1, wherein the optimization selection is further determined based on one or more elements comprising a subcarrier spacing, and a channel type.

4. The method of claim 3, wherein the channel type is determined based on a simulation model, and wherein the channel type comprises a static channel type and a fading channel type.

5. The method of claim 3, wherein the channel type is determined based on a variation rate of a reference signal received power (RSRP).

6. The method of claim 1, further comprising performing an on-the-fly oscillator S-curve calibration based on the set of temperatures.

7. The method of claim 6, wherein a trained S-curve under different temperature is generated based on the calibration.

8. The method of claim 7, wherein a temperature drift caused frequency drift is determined based on the trained S-curve.

9. The method of claim 7, wherein an oscillator drift compensation is performed based on the trained S-curve under different temperatures.

10. The method of claim 1, wherein a predefined lower value of the alpha coefficient and a predefined lower number of subframes for synchronization are selected when the temperature drift rate is smaller than a threshold based on the one or more look-up tables.

11. The method of claim 1, wherein the optimization selection is performed when the temperature is within a predefined temperature range.

12. A modem of a user equipment (UE), comprising:
   a temperature processing module that obtains sets of temperatures of the UE before the UE goes to a sleep mode of a connected discontinuous reception (CDRX) cycle and after the UE exits the sleep mode of the CDRX, and determines a temperature drift rate of the UE before and after the sleep mode of the CDRX cycle based on the sets of temperatures; and a central controller that generates one or more threshold look-up table and performs an optimization selection based on the temperature drift rate and the one or more threshold look-up tables, wherein the optimization selection comprising selecting an alpha coefficient and a number of subframes for synchronization.

13. The modem of claim 12, wherein the one or more look-up tables of thresholds are based on one or more factors comprising an alpha coefficient from a sync module of the UE, and a signal noise ratio (SNR) from a noise estimator.

14. The modem of claim 12, wherein the optimization selection is further determined based on one or more elements comprising a subcarrier spacing, and a channel type.

15. The modem of claim 14, wherein the channel type is determined based on a variation rate of a reference signal received power (RSRP).

16. The modem of claim 12, wherein the temperature processing module further performs an on-the-fly oscillator S-curve calibration based on the set of temperatures.

17. The modem of claim 16, wherein the temperature processing module generates a trained S-curve under different temperatures based on the calibration.

18. The method of claim 16, wherein an oscillator drift compensation is performed based on the trained S-curve under different temperatures.

19. The modem of claim 12, wherein the central controller selects a predefined lower value of the alpha coefficient and a predefined lower number of subframes for synchronization when the temperature drift rate is smaller than a threshold based on the one or more look-up tables.

20. The modem of claim 12, wherein the optimization procedure is performed when the temperature is within a predefined temperature range.

* * * * *